(12) United States Patent
Burnett

(10) Patent No.: US 8,639,075 B1
(45) Date of Patent: Jan. 28, 2014

(54) FIBER OPTIC CABLE WITH READILY REMOVABLE JACKET

(75) Inventor: Julie Anne Burnett, Acworth, GA (US)

(73) Assignee: Superior Essex Communications LP, Atlanta, GA (US)

(*) Notice: Subject to any disclaimer, the term of this patent is extended or adjusted under 35 U.S.C. 154(b) by 110 days.

(21) Appl. No.: 13/136,849

(22) Filed: Aug. 12, 2011

Related U.S. Application Data

(60) Provisional application No. 61/401,497, filed on Aug. 13, 2010.

(51) Int. Cl.
*G02B 6/44* (2006.01)

(52) U.S. Cl.
USPC ........... 385/107; 385/100; 385/102; 385/109; 385/113

(58) Field of Classification Search
USPC .......... 385/100, 102, 105–107, 109, 110–113
See application file for complete search history.

(56) References Cited

U.S. PATENT DOCUMENTS

| 2005/0201696 A1* | 9/2005 | Fee .............................. 385/101 |
| 2008/0219627 A1* | 9/2008 | Puzan et al. .................. 385/109 |
| 2009/0274426 A1 | 11/2009 | Lail |

OTHER PUBLICATIONS

Notice of Allowance tor U.S. Appl. No. 13/068,654, mailed on Jul. 8, 2013.
Non Final Rejection Mailed Mar. 25, 2013 U.S. Appl. No. 13/068,654.

* cited by examiner

*Primary Examiner* — Charlie Peng
*Assistant Examiner* — Hung Lam

(57) ABSTRACT

A communication cable can comprise optical fibers protected by an armor, such as a corrugated metallic tube. An outer jacket can cover the armor to provide environmental protection. A net located between the outer jacket and the armor can comprise openings, with the outer jacket extending into the openings, towards the armor. The net can be wrapped, formed, or woven around the armor, for example. The net can aid a craftsperson in separating the outer jacket from the corrugated metal tube, for example in connection with servicing the cable. The openings can control coupling between the outer jacket and the armor, for example providing a desired level of friction, bonding, adhesion, adherence, fusion, and/or contact between the outer jacket and the armor.

20 Claims, 5 Drawing Sheets

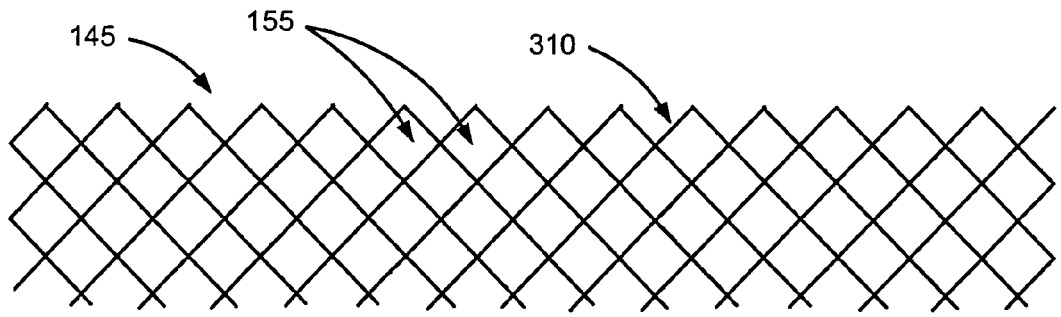
*Fig. 4*
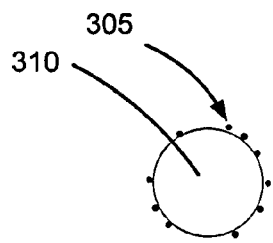
*Fig. 5*
*Fig. 6A*          *Fig. 6B*

FIBER OPTIC CABLE WITH READILY REMOVABLE JACKET

CROSS REFERENCE TO RELATED APPLICATIONS

This patent application claims priority under 35 U.S.C. §119 to U.S. Provisional Patent Application No. 61/401,497, entitled "Fiber Optic Cable with Easily Removable Jacket" and filed Aug. 13, 2010, the entire contents of which are hereby incorporated herein by reference.

FIELD OF THE TECHNOLOGY

The present invention relates to fiber optic cables and more specifically to providing a net between a jacket and an internal armor of a cable to facilitate removing the jacket from the armor to obtain fiber access, for example in connection with servicing or installing the cable.

BACKGROUND

Fiber optic cables include one or more optical fibers or other optical waveguides that conduct optical signals, for example carrying voice, data, video, or other information. Optical fibers are ordinarily susceptible to damage from water and physical stress. Without an adequate barrier, moisture may migrate into a fiber optic cable and weaken or destroy the cable's optical fibers. Without sufficient physical protection, stress or shock associated with handling the fiber optic cable may transfer to the optical fibers, causing breakage or stress-induced signal attenuation.

Fiber optic cables may incorporate one or more layers of armor under one or more layers of jacketing, including an outer jacket. The armor offers mechanical protection, such as crush and rodent resistance. A metallic armor can further facilitate locating a buried cable. The outer jacket covers the armor for environmental protection.

In many cable installations, a craftsperson, such as a field service technician, may seek access to optical fibers of a cable at a place other than at a cable end, such as at a midpoint along a cable span. In such circumstances, the craftsperson may strip the outer jacket from the armor as a step in gaining access to the delicate optical fibers within the cable core. Some of the cable's fibers may carry live traffic during the service procedure, and the craftsperson is faced with the intricate task of avoiding any damage to the fibers. Apart from severing a fiber, even a seemingly insignificant, inadvertent nick of a cable tube can lead to premature fiber failure.

Accordingly, cable designers seek to control adhesion between the jacket and the armor. Too little adhesion can not only weaken structural integrity but also result in an annular gap through which water can detrimentally migrate if the cable suffers damage. Too much adhesion can complicate field service operations that involve stripping the jacket.

Conventional technologies for controlling adhesion between the jacket and the armor are generally limited. One approach involves coating the armor with a polymer that adheres to the jacket but has a low cohesive strength to facilitate peeling the jacket from the armor. Another approach involves applying a hot-melt substance, such as atactic polyolefin polymer, between the jacket and the armor. Such conventional approaches can pose challenges in terms of supply availability, manufacturing complications, and consistent performance.

Accordingly, to address such representative deficiencies in the art, improved cable technology is needed for protecting optical fibers while facilitating service operations. Need exists for controlling coupling between adjacent elements of a cable, including cable armor and cable jacketing. Need exists for blocking flow of water between armor and a jacket of a cable. Further need exists for covering a cable with a jacket that can be readily stripped or peeled in the field without undue labor or complicated tools or without risking damage to delicate optical fibers of the cable. Further need exists for cable jacketing technology that is conducive to economical manufacturing. A capability addressing one or more of the aforementioned needs, or some related shortcoming in the art, would promote optical fibers for communications and other applications.

SUMMARY

The present invention can support protecting one or more optical fibers in a cable package that promotes field service, such as facilitating jacket removal.

In one aspect of the present invention, a fiber optic cable can comprise armor, such as corrugated metal formed around a cable core and housing one or more optical fibers. A jacket can cover the armor and provide environmental protection. A net can be disposed between the jacket and the armor. The net can extend circumferentially around the armor and can run lengthwise along the fiber optic cable. The net can comprise strands and openings, with the jacket material protruding into the openings towards the armor. The protruding jacket material can contact and/or adhere to the armor. Alternatively, the jacket material can protrude inward without making contact with the armor. The strands and associated openings can control coupling between the jacket and the armor. Geometric, form, thickness, and/or material selection of the net can control coupling, such as through friction, bonding, adhesion, adherence, fusion, and/or contact between the outer jacket and the armor. Geometry and/or dimensions of the openings and associated strands can affect friction, bonding, adhesion, adherence, fusion, and/or contact between the outer jacket and the armor, for example.

The discussion of fiber optic cables presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with ordinary skill in the art upon examination of the following drawings and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWINGS

FIG. 3, are cross sectional illustrations of an exemplary interface between a jacket and an armor of a fiber optic cable in accordance with certain embodiments of the present invention.

FIG. 4 is a plan view of a section of an exemplary net for disposing between a jacket and an armor of a fiber optic cable in accordance with certain embodiments of the present invention.

FIG. 5 is a cross sectional illustration of an exemplary net strand in accordance with certain embodiments of the present invention.

FIG. 6A is a cross sectional illustration of an exemplary net strand in accordance with certain embodiments of the present invention.

FIG. 6B is a cross sectional illustration of an exemplary net strand in accordance with certain embodiments of the present invention.

Figure 1:
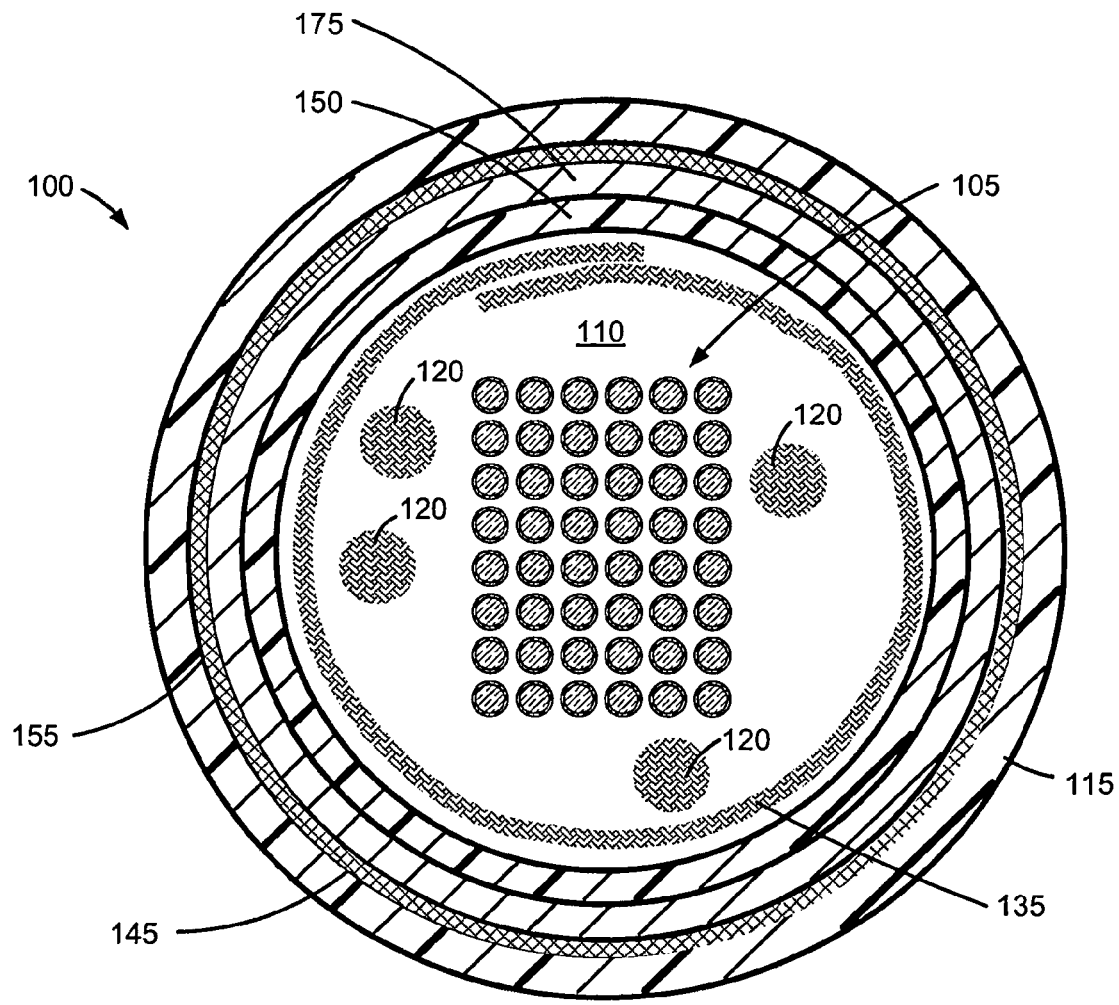
FIG. 1 is a cross sectional illustration of an exemplary fiber optic cable that provides controlled coupling between a jacket and an armor of the cable in accordance with certain embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help convey such principles visually. In the drawings, reference numerals designate like or corresponding, but not necessarily identical, elements throughout the several views.

DETAILED DESCRIPTION OF EXEMPLARY EMBODIMENTS

Embodiments of the present invention can support protecting an optical fiber from damage associated with applied forces and moisture incursion. Afforded mechanical protection can include stabilizing the optical fiber and/or cushioning the optical fiber from mechanical impact, shock, physical stress, jarring, unwanted motion, damaging acceleration or deceleration, force, or other detrimental effect.

A fiber optic cable can comprise a jacket that extends longitudinally, along the fiber optic cable, over an armor or other element or elements providing crush resistance. The jacket can comprise a sheath, one or more layers of sheathing, a casing, a shell, a skin, or a tube spanning the fiber optic cable, typically comprising pliable or flexible material such as plastic or polymer. Accordingly, the jacket can run lengthwise along the fiber optic cable and cover an armor or other element or elements for imparting the cable with desirable mechanical attributes. A net located between the jacket and the armor or other element can provide controlled coupling of the jacket to the armor or other cable element.

Figure 2:
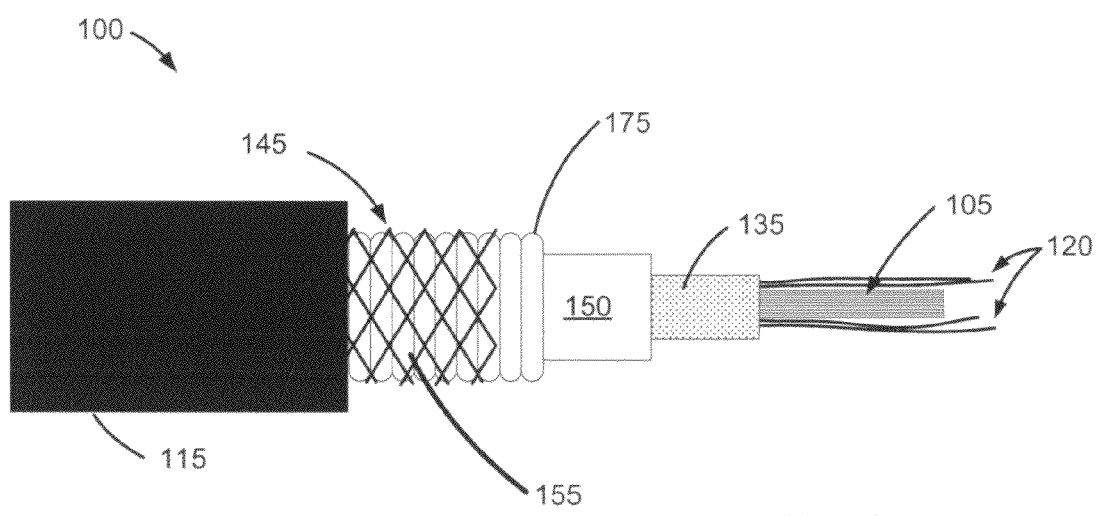
FIG. 2 is a side illustration of an exemplary fiber optic cable that provides controlled coupling between a jacket and an armor of the cable in accordance with certain embodiments of the present invention.
Figure 3A:
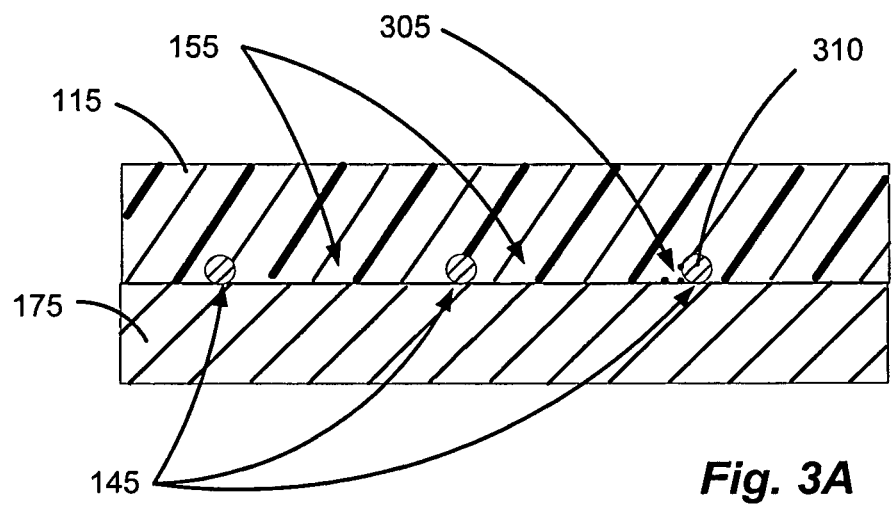
FIGS. 3A and 3B, collectively
Figure 7:
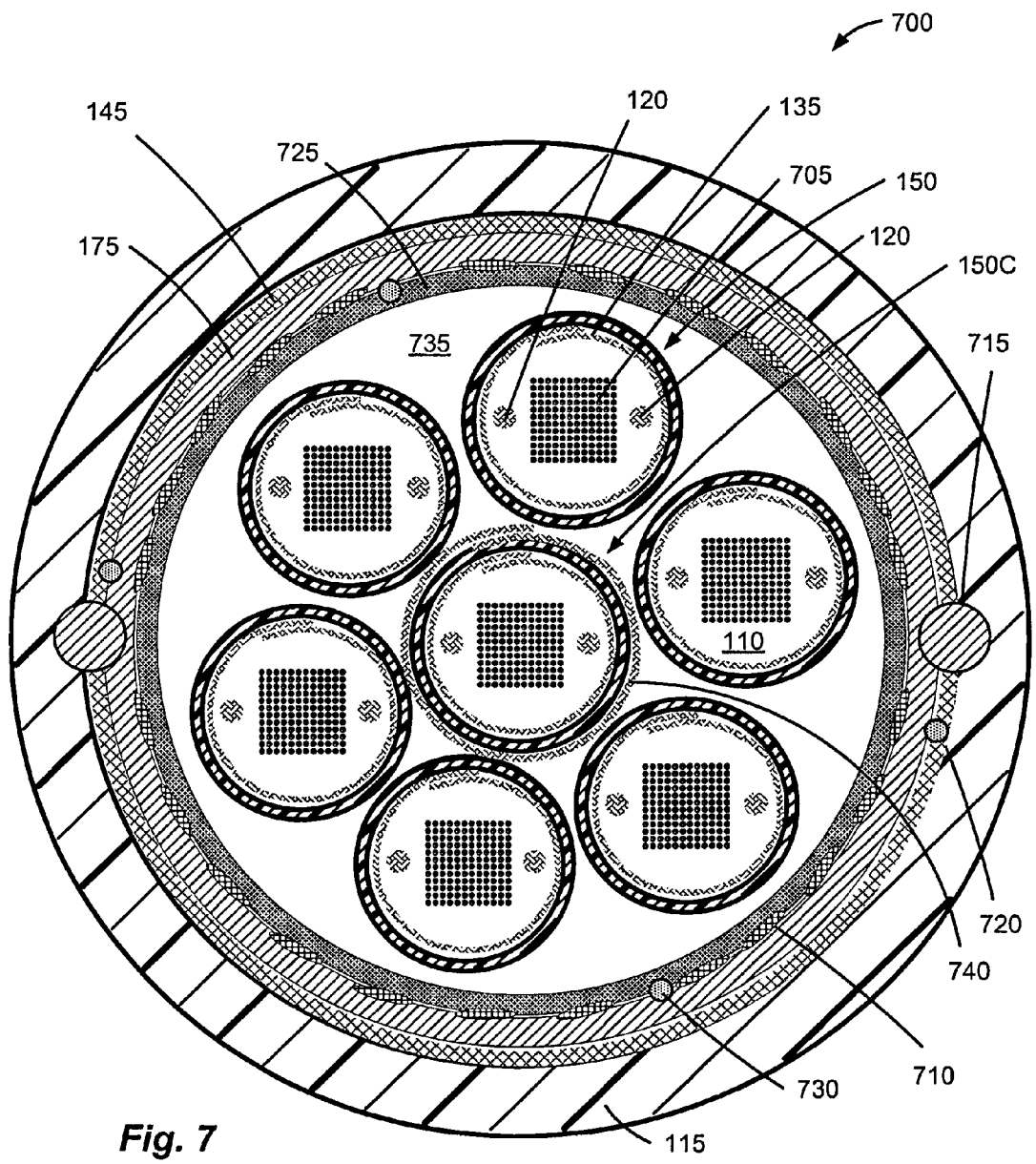
FIG. 7 is a cross sectional illustration of an exemplary fiber optic cable that provides controlled coupling between a jacket and an armor of the cable in accordance with certain embodiments of the present invention.

Cabling technology will now be discussed more fully hereinafter with reference to FIGS. 1-7, which describe representative embodiments of the present invention. FIGS. 1, 2, and 3 respectively provide end-on, lengthwise, and detail cross sectional views of a representative fiber optic cable achieving controlled jacket-to-armor coupling to facilitate jacket removal. FIGS. 4, 5, 6A, and 6B describe representative elements for controlling jacket-to-armor coupling and facilitating jacket removal. FIG. 7 provides an end-on view of another fiber optic cable that comprises a readily removable jacket and that achieves controlled jacket-to-armor coupling.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIGS. 1, 2, and 3, these figures illustrate a fiber optic cable 100 that provides controlled coupling between a jacket 115 and an armor 175 of the cable 100 according to certain exemplary embodiments of the present invention. FIG. 1 provides an end-on view, FIG. 2 presents a side view, and FIG. 3 shows progressively detailed views of an interface between the jacket 115 and the armor 175. As discussed in further detail below with respect to subsequent figures, the illustrated fiber optic cable 100 comprises a net 145 that comprises openings 155 and that is disposed between the jacket 115 and the armor 175. The net 145 can control jacket-to-armor coupling and facilitate jacket removal.

The jacket 115 of the fiber optic cable 100 forms an outer, cylindrical surface that provides environmental protection, including a moisture barrier. The jacket 115 can further impart the fiber optic cable 100 with strength and structural integrity. In the illustrated embodiment, the jacket 115 can be characterized as a sheath or a casing. The jacket 115 can have a polymer or polymeric composition, for example a fluoropolymer such as FEP, TFE, PTFE, PFA, etc.; or another polymer such as olefin, polyester, silicone, polypropylene, polyethylene, medium density polyethylene, or polyimide; or some other polymer or other material that provides acceptable strength, fire resistance, or abrasion and chemical properties as may be desirable for various applications. Certain exemplary embodiments comprise thermoplastic material while other embodiments can comprise thermosetting plastic.

Certain exemplary embodiments of the jacket 115 can be characterized as comprising polymeric material. The term "polymeric material," as used herein, generally refers to a material that comprises one or more polymers. Accordingly, a jacket of polymeric material can comprise one or more polymers and one or more additional, non-polymer materials.

In the illustrated embodiment, the jacket 115 circumferentially covers an armor 175, which may comprise corrugated metal, offering mechanical protection, including crush resistance. In certain exemplary embodiments, the armor 175 comprises a shield, and the fiber optic cable 100 can be viewed as a shielded cable, for example. The armor 175 can provide electrical shielding for cable embodiments comprising copper conductors, such as twisted pairs, for example. The armor 175 can also provide a capability to conduct a tone or other signal applied for identification and location when the fiber optic cable 100 is buried or deployed in an underground application. Certain embodiments of the fiber optic cable 100 comprise other forms of armor, for example utilizing braided or interlocking metal, fiberglass, composite, or ceramic material or materials.

The net 145 located between the jacket 115 and the armor 175, facilitates removal of the jacket 115 and/or controls coupling between the jacket 115 and the armor 175. The term "coupling," as used herein, generally refers to one or more interactions between elements or systems, and can encompass bonding, adhesion, adherence, fusion, friction, and/or contact.

The net 145, exemplary embodiments of which are illustrated in FIGS. 4, 5, 6A, and 6B and discussed below, comprises openings 155, the number, form, and/or size of which can control the amount or level of coupling between the jacket 115 and the armor 175. As illustrated in the detail cross sectional views of FIG. 3, in certain embodiments, the jacket 115 bulges, sags, or protrudes into the openings 155 towards the armor 175. Such protrusion can occur during extrusion of the jacket 115 over the armor 175, for example. (For many embodiments of the fiber optic cable 100, the thickness of the net 145 as viewed in FIG. 3 may be considered exaggerated.)

In certain embodiments, the jacket 115 contacts the armor 175 through the openings 155. In certain embodiments, the jacket 115 adheres to the armor 175 through the openings 155. In certain embodiments, the jacket 115 bonds to the armor 175 through the openings 155. In certain embodiments, the jacket 115 fuses to the armor 175 through the openings 155.

In certain exemplary embodiments, the armor 175 comprises a polymer coating applied over metallic surface. Such a polymer coating can bond the net 145 and the armor 175 to one another during jacket extrusion or as a result of heat from an extrusion process. Further, a polymer coating can bond the jacket 115 to the armor 175 through the openings 155. In certain embodiments, the jacket 115 can bond to the net 145 as well or alternatively.

Figure 3B:
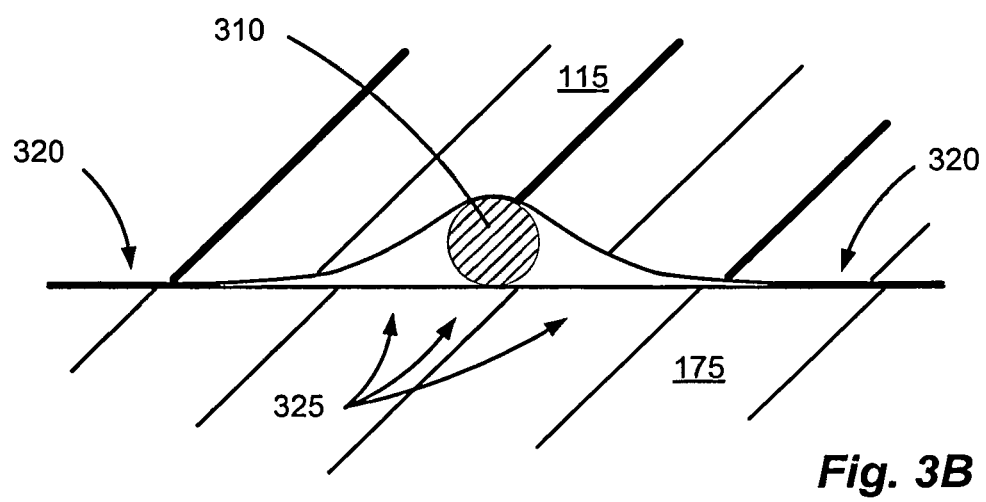

In certain exemplary embodiments, the jacket 115 bulges or protrudes to contact a portion of a region 320 of the armor 175 lying under each opening 155 without contacting all of the region 320 of the armor 175 lying under each opening 155. As exemplarily illustrated in FIG. 3B, contact between the jacket 115 and the armor 175 may occur at the center of an opening 155 with separation present in a region 325 around the opening periphery. For example, a bulging or protruding portion of the jacket 115 can form a convex surface contour, the apex of which contacts the armor 175. In certain exemplary embodiments, the jacket 115 may bulge or protrude into the openings 115 without contacting the armor 175. Accordingly, a gap may exist between the jacket 115 and the armor 175 within each opening 155. In certain embodiments, such a gap can reach an apex adjacent a strand 310 of the net 145, for example forming a concave surface contour in the jacket 115 as illustrated in FIG. 3B.

In certain exemplary embodiments, particles 305 of super absorbent material are located in such a gap or may be encapsulated between the armor 175 and the jacket 115. Such particles 305 of super absorbent material, which can comprise powder, may be present in the openings 155 as an artifact of a fabrication process or may be deliberately metered into the openings 155, for example.

In certain embodiments, the level of coupling between the jacket 115 and the armor 175 in the region 320 of an opening 155 (or in multiple regions 320 of multiple openings 155) is substantially higher than the level of coupling between the jacket 115 and the armor 175 in the region 325 that is in proximity to or directly under strands of the net 145. For example, jacket-to-armor coupling may be reduced below, alongside, or laterally adjacent a strand of the net 145 relative to a center of an opening 155. In certain embodiments, the level of coupling between the jacket 115 and the armor 175 in a center of a opening 155 is at least about ten, twenty, or thirty times higher than the level of coupling between the jacket 115 and the armor 175 adjacent strands of the net 145.

Reduction in jacket-to-armor coupling beneath the strands of the net 145 can facilitate jacket removal. For example, a craftsperson can use the net 145 as an aid in peeling or stripping the jacket 145 from the armor 175 as may be useful during cable installation, repair, or other service.

In certain exemplary embodiments, the fiber optic cable 100 comprises strength members (not illustrated in FIGS. 1, 2, and 3 but discussed below with reference to FIG. 7), such as slender steel or fiberglass rods or aramid cords, disposed between the armor 175 and the jacket 115. For example, two radial strength members can be located under the jacket 115 to enhance structural support. Such members may be positioned either over or under the net 145.

One or more "rip cords" may also be disposed between the jacket 115 and the armor 175 to facilitate separating the jacket 115 from the armor 175 via pulling the rip cords. Such rip cords can help open the fiber optic cable 100 for installation or field service. In certain embodiments, one or more rip cords can be disposed under the net 145. In certain embodiments, one or more rip cords can be disposed over the net 145.

In the illustrated embodiment, the fiber optic cable 100 also comprises a buffer tube 150 disposed beneath the armor 175. In certain exemplary embodiments, some annular gap may be present between the buffer tube 150 and the armor 175. Any such gap can also be filled if desired, for example with water-swellable material. Ordinarily, the buffer tube 150 and the armor 175 can be essentially flush with one another. Alternatively, the fiber optic cable 100 can be free of buffer tubes, for example utilizing buffered optical fibers that can be deployed effectively without an accompanying buffer tube.

The term "buffer tube," as used herein, generally refers to a tube for containing one or more optical fibers and for providing such optical fibers annular space for lateral movement. When a fiber optic cable is bent, optical fibers in a buffer tube of the cable may move towards one side of the buffer tube, for example.

In certain exemplary embodiments, the fiber optic cable 100 comprises an aramid material or some other form of strength member disposed between the buffer tube 150 and the armor 175. One or more rip cords may also be disposed between the buffer tube 150 and the armor 175 to facilitate opening the armor 175 in connection with terminating the fiber optic cable 100, or performing some related service.

In an exemplary embodiment, the buffer tube 150 extends along the cable's longitudinal axis and is formed from high density polyethylene. The buffer tube 150 provides a space 110 for optical fibers 105 and protective materials. The space 110 is a three-dimensional or cylindrical volume extending along the fiber optic cable 100. In the illustrated exemplary embodiment, the protective materials comprise water-swellable yarns 120 and a water-swellable tape 135 disposed in the space 110 along with the optical fibers 105. In certain embodiments, loose SAP powder or particles can be disposed in the space 110. Accordingly, the buffer tube 150 contains a bundle of optical fibers 105 disposed "loose" in the tube's hollow interior.

In certain exemplary embodiments, the fiber optic cable 100 comprises a gas such as air or nitrogen in the space 110, with such gas contacting the optical fibers 105, the water-swellable yarns 120 and the water-swellable tape 135, for example. A manufacturing environment can result in air being in a cable core at substantially the same pressure as the atmosphere outside the cable 100, for example. As discussed above, the space 110 can further contain loose SAP particles or powder that such gas may contact. In certain exemplary embodiments, the space 110 is essentially filled with solid and gaseous materials, wherein the water-swellable yarns 120, the water-swellable tape 135, and the optical fibers 105 (which may comprise glass) are solid materials. Accordingly, the fiber optic cable 100 can comprise a "dry cable" that is substantially free from gels, greases, or fluids for protecting the optical fibers 105 from unwanted water or moisture incursions or for helping maintain the buffer tube's shape. The term "dry," as used herein in the context of characterizing a fiber optic cable or a element thereof, generally indicates that the fiber optic cable or element does not incorporate fluids, greases, or gels for blocking water incursion.

In certain embodiments, the fiber optic cable 100 can comprise voids within the buffer tube 150 that are filled with gaseous matter or that are otherwise free from water-blocking gels, greases, or fluids. In one exemplary embodiment, the space 110 is filled by, consists of, or essentially consists of: (a) dry water-blocking materials; (b) air; and (c) the optical fibers 125. Nevertheless, trace or residual materials may be present in the space 110, for example contaminates, moisture, debris, water that the water-blocking materials are addressing, secondary materials present from manufacturing, and related matter. Such dry water-blocking materials can include the water-swellable yarns 120 and/or the water-swellable tape 135.

As an alternative to a dry cable, the net 145 can be applied between a jacket 115 and an armor 175 of a fiber optic cable that comprises, or is filled with, one or more water-blocking gels, greases, or fluids, thereby controlling jacket-to-armor coupling.

In the illustrated exemplary embodiment, the fiber optic cable 100 contains 48 optical fibers 105 in the buffer tube 150. The optical fibers 105 can form a bundle with ribbons of the optical fibers 105 adjacent one another and forming a single unit. A twist in the bundle of optical fibers 105 along the length of the fiber optic cable 100 captures the ribbon stack into a single unit and helps distribute bending stresses among individual optical fibers 105. That is, a stack of ribbons of optical fibers 105 exhibits a lay or a periodic rotation about its central axis. The bundle of optical fibers 105 has freedom of motion within the buffer tube 150, as the inner diameter of the buffer tube 150 is somewhat larger than the diagonal of the bundle's cross section. In one exemplary embodiment, the ratio of the bundle's diagonal to the inner diameter of the buffer tube 150 is between about 0.62 and about 0.85.

Accordingly, in certain exemplary embodiments, the optical fibers 105 are organized in linear arrays or "ribbons" of optical fibers 105, with the arrays stacked on top of one another. For example, each ribbon may include twelve optical fibers 105, with the ribbons stacked to achieve the desired fiber capacity (typically up to 18 ribbons).

The illustrated number of optical fibers 105 and the illustrated configuration are intended to be exemplary rather than limiting. The optical fibers 105 may be bundled in units of twelve, or may alternatively be loose without encasing in a ribbon matrix or bundle structure. Each optical fiber 105 could be a single mode fiber or some other optical waveguide that carries communications data. In various exemplary embodiments, the optical fibers 105 can be single mode or multimode and can have a composition based on glass, glassy, or silica material. Alternatively, the optical fibers 105 can incorporate plastic material as an optical transmission medium.

In certain exemplary embodiments, electrically conductive wires, such as twisted pairs of individually insulated electrical conductors, are substituted for some or all of the optical fibers 105. Thus, the present technology for controlling jacket-to-armor coupling can be applied to communications cables that incorporate electrically conductive media rather than optical fibers (or in addition to optical fibers), coax cables, twisted pair cables, and hybrid fiber-copper cables, for example.

In the illustrated exemplary embodiment, the buffer tube 150 contains four water-swellable yarns 120 and one water-swellable tape 135 for protecting the optical fibers 105. The number of water-swellable yarns 120 and the number of water-swellable tapes 135 are exemplary rather than limiting.

Strands of the water-swellable yarn 120 lie alongside the optical fibers 105, typically in random locations and orientations. In an exemplary embodiment, the four illustrated strands of water-swellable yarns 120 can be 1800 denier water-swellable yarn, such as those Geca Tapes BV of Bailleul, France sells under the product designator "Geca GTB-50." In certain embodiments, the water-swellable yarns 120 can be slightly expanded in cross section when introduced into the buffer tube 150 during cable fabrication.

In an exemplary embodiment, the water-swellable yarn 120 comprises particles of super absorbent material that cling to yarn filaments. In certain exemplary embodiments, the particles cling without any adhesives, binders, cured materials, or wetted surfaces. The superabsorbent material chemically reacts with water, when present. However, in certain exemplary embodiments, the superabsorbent material is insoluble (or essentially insoluble) in water.

In one exemplary embodiment, the superabsorbent material comprises sodium polyacrylate powder. The term "super absorbent polymer" or "SAP," as used herein, generally refers to a material that can absorb or otherwise capture at least 50 times its weight in water (including without limitation liquid and vapor forms of water) or a liquid. Polyacrylonitrile starch graft polymer, saponified polyacrylonitrile starch graft polymer, polyacrylamide, and sodium polyacrylate are examples of SAP; however, this is not an exhaustive list. Typically, SAP swells or may assume a gelatinous state in the presence of water, thereby absorbing the water. SAP materials may have a granular or powder form, may be beads, or may have a variety of shapes. Many SAP materials can absorb 100 times their weight in water.

The term "water-swellable yarn," as used herein, generally refers to a yarn that comprises a super absorbent polymer, with the term encompassing yarn in which super absorbent polymer clings to a yarn surface. Yarn may comprise one or more threads, filaments, cords, ropes, fibrous materials, fibers, strands, or similar structures that may include man-made or natural materials.

The water-swellable yarns 120 may offer mechanical functionality in addition to absorbing water. The water-swellable yarns 120 can provide a "cushioning" effect to mitigate contact between the optical fibers 105 and the buffer tube 150, thereby improving signal quality. Orienting the water-swellable yarns 120 along the fiber optic cable's longitudinal axis, rather than helically wound around the optical fibers 105, avoids the water-swellable yarns 120 constricting the optical fibers 105 when the fiber optic cable 100 is strained.

The water-swellable yarns 120 can inhibit water flow into the fiber optic cable 100 and along the space 110 of the fiber optic cable 100. The water-swellable yarns 120 may respond faster than the water-swellable tape 135 to initial water incursion, while the water-swellable tape 135 can absorb water over an extended amount of time. Accordingly, the water-swellable yarns 120 can offer the water-swellable tape 135 sufficient time to respond and swell to absorb water.

The water-swellable tape 135 within the buffer tube 150 extends lengthwise in the buffer tube 150 and is formed or wrapped around the bundle of optical fibers 105. More specifically, the water-swellable tape 135 runs generally parallel to the bundle of optical fibers 105 and is curled lengthwise over the bundle of optical fibers 105. As a result of curling, one surface of the water-swellable tape 135 is adjacent and essentially parallel to the interior surface of the buffer tube 150. One lengthwise edge of the water-swellable tape 135 is placed over the tape's other lengthwise edge so that the water-swellable tape 135 fully circumscribes the bundle of optical fibers 105. Geca Tapes BV is a suitable tape supplier, for example the product designated "Geca GFX-1135."

The term "water-swellable tape," as used herein, generally refers to a slender strip of material that comprises super absorbent polymer, with the term encompassing tape in which super absorbent polymer clings to a tape surface. The slender strip of material can comprise a ribbon, a strip of cloth, a strip of film, etc. and may include one, two, or more different types of materials.

In an exemplary embodiment, the water-swellable tape 135 in the buffer tube 150 comprises a single layer of non-woven polyester with particles of superabsorbent polymer powder adhering loosely to one surface thereof. In one exemplary embodiment, the substrate material is not necessarily inherently flame retardant. The particles typically cling to the polyester substrate without any adhesives, curing, or intervening materials. Alternatively, one or more adhesive agents may adhere SAP to the tape substrate. The non-woven substrate can be porous, with SAP particles disposed in, but not necessarily filing the pores. The thickness and width of the substrate (and of the water-swellable tape 135 itself) can be controlled to optimize water blocking.

The side of the water-swellable tape 135 to which the SAP particles adhere typically faces the optical fibers 105, while the opposite, bare side contacts the interior wall of the buffer tube 150 and thus faces outward. The water-swellable tape 135 and the water-swellable yarn 120 typically comprise similar chemicals for water absorption. In an exemplary embodiment, the water-swellable tape 135 can be non-compressible, without necessarily needing any foam material, foam layers, adhesives, binders, cured agents, or wetted material.

In certain exemplary embodiments, a water-swellable tape (not illustrated in FIGS. 1 and 2) is located immediately outside the buffer tube 150 and is curled over the buffer tube 150 in essentially the same manner that the illustrated water-swellable tape 135 is curled over the bundle of optical fibers 105. Such an outer water-swellable tape typically may have the same structure, composition, and features as the illustrated water-swellable tape 135. However, one difference between the outer water-swellable tape and the illustrated water-swellable tape 135 is that the outer water-swellable tape may be wider to accommodate the larger circumference needed to cover the outer surface of the buffer tube 150. Accordingly, the outer tape can comprise a single ply of polyester material coated with SAP particles on one side thereof, with the coated side facing inward.

Exemplary embodiments of the net 145 will now be discussed in further detail with reference to FIGS. 4, 5, 6A, and 6B. FIG. 4 illustrates a plan view of a section of the net 145 for disposing between a jacket 115 and an armor 175 of a fiber optic cable 100 according to certain exemplary embodiments of the present invention.

The net 135 illustrated in FIG. 4 extends lengthwise along the fiber optic cable 100 (as shown in FIGS. 1, 2, and 3 and discussed above) and is formed or wrapped around the armor 175. In an exemplary embodiment, the net 145 is curled lengthwise over the armor 175. Accordingly, an interior facing surface of the net 145 can adjoin the armor 175 while an exterior facing surface can adjoin the jacket 115. One lengthwise edge of the net 145 can be placed over the net's other lengthwise edge so that the net 145 fully circumscribes the armor 175. In certain embodiments, the net 145 can be woven around the armor 175, for example, as the armor 175 formed over the cable core feeds into a weaving or net-forming machine.

The term "net," as used herein, generally refers to an open or meshed material, and such material may comprise a pattern of strands that are knitted, woven, knotted, or fused. A net can include, without limitation, netting, webbing, web, web-like material, mesh, screen, lacelike fabrics, knitted fabrics of open texture, woven fabric of open texture, knotted fabric of open texture, and materials in which strands are fused together to form a network of strands resembling a fishnet, arrangements of interlocking links or loops of strands, for example. In certain embodiments, strands of a net can intermittently adhere to one another via bonding or partial melting. Embodiments of the net 145 can comprise any one or more of the net examples, disclosed in this paragraph, without limitation.

The term "strand," as used herein, generally refers to one or more fibers, fiber-like structures, filaments, filament-like structures, monofilaments, monofilament-like structures, threads, thread-like structures, ropes, rope-like structures, twines, twine-like structures, yarns, or yarn-like structures. A strand can comprise multiple supple elongate materials that are bundled, plaited, braided, twisted, or otherwise grouped together to form a rope, cord, or the like. Embodiments of the net 145 can comprise any one or more of the strand examples, disclosed in this paragraph, without limitation.

In certain exemplary embodiments, the net 145 can have exactly one layer or be single ply. Alternatively, the net 145 can have multiple layers or be multi-ply. In certain exemplary embodiments, the net 145 comprises an inorganic material, such as glass fiber. In certain exemplary embodiments, the net 145 comprises an organic material. In certain exemplary embodiments, the net 145 comprises a polymeric material. In certain exemplary embodiments, the net 145 comprises a thermoplastic material. In certain exemplary embodiments, the net 145 comprises thermosetting plastic. In certain exemplary embodiments, the net 145 comprises aramid fibers. In certain exemplary embodiments, the net 145 comprises a fluoropolymer such as FEP, TFE, PTFE, PFA, etc. In certain exemplary embodiments, the net 145 comprises olefin, polyester, silicone, polypropylene, polyethylene, medium density polyethylene, or polyimide. In certain exemplary embodiments, the net 145 comprises a natural material, such as cotton, wool, animal fiber, sisal, hemp, or plant fiber, to mention a few representative examples.

In certain embodiments, the net 145 and the jacket 115 are made of different thermoplastic materials, with the thermoplastic material of the net 145 having a higher melting point than the thermoplastic material of the jacket 115. In such an embodiment, the jacket 115 can be extruded over the net 145 at a temperature that avoids melting the net 145.

In certain embodiments, the net 145 and the jacket 115 are made of different materials, with the material of the net 145 being able to withstand temperature of extrusion of the jacket 115 over the net 145. For example, the net 145 can have a higher temperature of degradation than the melt or extrusion temperature of the jacket 115.

In certain exemplary embodiments, the net 145 comprises openings 155 that are diamond shaped, square, or rectangular. In certain embodiments, the openings 155 of the net 145 are circular, oval, octagonal, hexagonal, or some other appropriate geometric form. In certain embodiments, the geometric form or forms may be selected to provide desired coupling as may be beneficial for an application. In certain exemplary embodiments, the openings 155 are arranged in a repeating pattern. In certain exemplary embodiments, the openings 155 are random in orientation, size, and/or position. In certain exemplary embodiments, the openings 155 of the net 145 have like form. In certain exemplary embodiments, the openings 155 of the net 145 are of differing size, shape, orientation, or geometric form.

In certain exemplary embodiments, the narrow dimension of the net 145, that is the width of the net 145, has at least two openings 155. In certain exemplary embodiments, the narrow dimension of the net 145 has at least three openings 145. In certain exemplary embodiments, the narrow dimension of the net 145 has at least five openings 145. In certain exemplary embodiments, the narrow dimension of the net 145 has between about two and about twenty openings 155.

In certain exemplary embodiments, the narrow dimension of the net 145 is approximately the same size as the outer circumference of the armor 175. In certain exemplary embodiments, the net 145 is stretched around the armor 175. In such a stretched condition, the net 145 may be slightly wider than the outer circumference of the armor 175.

In certain exemplary embodiments, the net 145 has a width extending circumferentially around the armor 175 and comprises openings 155 each having a dimension that is in a range of ten to fifty percent of the width. In certain exemplary embodiments, each of the openings 155 has at least one respective dimension that is at least approximately one-eighth of the outer circumference dimension of the armor 175 and is no more than approximately one-half of that circumference dimension.

In certain exemplary embodiments, the openings 155 account for at least ten percent of the total surface area of the net 145. In certain exemplary embodiments, between approximately ten and approximately seventy-five percent of the net 145 is open on an area basis. In certain exemplary embodiments, the openings 155 account for between about ten and about seventy-five percent of the surface area of the net 145.

In certain exemplary embodiments, between approximately ten and approximately ninety-nine percent of the net 145 is open on an area basis. In certain exemplary embodiments, the openings 155 account for between about ten and about ninety-nine percent of the surface area of the net 145.

In certain exemplary embodiments, between approximately seventy-five and approximately ninety-nine percent of the net 145 is open on an area basis. In certain exemplary embodiments, the openings 155 account for between about seventy-five and about ninety-nine percent of the surface area of the net 145.

Turning now to FIG. 5, this figure illustrates in cross section a net strand 310 according to certain exemplary embodiments of the present invention. In the illustrated embodiment, the strand 310 is a monofilament. In an exemplary embodiment, the strand 310 has is diameter between about 250 microns and about 600 microns.

Particles 305 of super absorbent material adhere to the strand 310. As a result of these particles 305 or of a base filament composition, the strand 310 can be water swellable. The particles 305 can comprise superabsorbent polymer powder adhering loosely to the strand 310. In certain exemplary embodiments, the particles can comprise a sodium polyacrylate or a potassium polyacrylate/acrylamide copolymer. Some or all of the particles 305 may cling to the strand 310 without any adhesives, curing, or intervening materials. Alternatively, one or more adhesive agents may adhere the particles 305 to the strand.

Turning now to FIG. 6A, this figure illustrates in cross section a net strand 310A according to certain exemplary embodiments of the present invention. In the illustrated embodiment, the strand 310A comprises multiple filaments of differing sizes and may be characterized as a type of a yarn. In an exemplary embodiment, the strand 310A has a diameter between about 250 microns and about 600 microns.

Turning now to FIG. 6B, this figure illustrates in cross section a net strand 310B according to certain exemplary embodiments of the present invention. In the illustrated embodiment, the strand 310B comprises multiple filaments of common size and may be characterized as a type of a yarn. In an exemplary embodiment, the strand 310B has a diameter between about 250 microns and about 600 microns.

Turning now to FIG. 7, this figure illustrates a cross sectional view of a fiber optic cable 700 that provides controlled coupling between a jacket 115 and an armor 175 of the cable 700 according to certain exemplary embodiments of the present invention. In certain exemplary embodiments, the fiber optic cable 700 can comprise multiple ones of the units illustrated in FIGS. 1, 2, and 3 and discussed above in a package that comprises at least one net 145. The net 145 can comprise openings 155 operable to control coupling between two adjoining/adhering cable elements and/or to facilitate separating the two cable elements from one another, such as by peeling one from the other.

As illustrated, the fiber optic cable 700 comprises a ring of buffer tubes 150 disposed about a central buffer tube 150C. More specifically, the illustrated fiber optic cable 700 comprises a six-around-one configuration whereby six buffer tubes 150 are disposed generally about or can be stranded around a seventh buffer tube 150C. In certain exemplary embodiments, the buffer tubes 150, 150C are substantially identical to one another or are manufactured to a common specification. In certain exemplary embodiments, the elements and configuration within each of the buffer tubes 150, 150C can be substantially identical or made to a common manufacturing specification.

The illustrated configuration synergistically combines ruggedness provided by buffer tube stranding with a fully operational central buffer tube 150C to achieve high loading capacity and high cable strength. Accordingly, the fiber optic cable 700 can carry a large number of optical fibers in a compact diameter. For example, the configuration of the illustrated embodiment can support a capacity of 1008 optical fibers.

Each buffer tube 150, 150C carries or encloses a stack of fiber optic ribbons 705, two or four water-swellable yarns 120, and a water-swellable tape 135. In the illustrated embodiment, the water-swellable tape 135 contacts or adjoins the inner surface of the associated buffer tube 150, 150C, the water-swellable yarn 120, and the stack of fiber optic ribbons 705. Further, the stack of fiber optic ribbons 705 contacts or adjoins the water-swellable yarn 135.

In certain exemplary embodiments, the water-swellable tape 135 comprises single-ply, typically non-woven polyester, and is impregnated with an SAP powder, such as a sodium polyacrylate or a potassium polyacrylate/acrylamide copolymer. In an exemplary embodiment, the water-swellable tape 135 runs along and contacts the inner wall of its associated buffer tube 150, 150C, with the SAP powder disposed on the side of the water-swellable tape 135 that faces the stack of fiber optic ribbons 705. The water-swellable tape 135 can be a type known in the trade as "Geca GFX-1135," as discussed above.

The water-swellable yarns 120 can be a type known in the trade as "Geca GTB-50" as discussed above, and can block potential water channels.

The buffer tubes 150, 150C, as well as cabled buffer tubes, can be tested and rated to typical industry standards, such as Telcordia GR-20-CORE, RDUP Bulletin 1753F-601 (PE-90) and ANSI/ICEA S-87-640, for mechanical and environmental performance requirements.

In the illustrated embodiment, each stack of fiber optic ribbons 705 comprises 12 fiber optic ribbons, with each ribbon comprising 12 optical fibers. Other embodiments can comprise fewer or more ribbons, ribbons with fewer or more optical fibers, or optical fibers that are not ribbonized, for example. Accordingly, the illustrated numbers of optical fibers, ribbons, and buffer tubes is exemplary, is non-limiting, and is among others that exemplary embodiments of the present invention can support.

As illustrated, another water-swellable tape 740 is applied over the central buffer tube 150C, between the central buffer tube 150C and the six surrounding buffer tubes 150. Suitable product for this water-swellable tape 740 is available from Chengdu Centran Industrial Co., Ltd of Sichuan, China under the trade identifier "Centran CZSD-20." The water-swellable tape 740 helps prevent water flow in the open space 735 of the cable core.

Various structures benefiting from controlled coupling achieved with a net 145 having openings 155 (as illustrated in FIG. 4 and discussed above) can be disposed over the buffer tubes 150, 150C. In the illustrated embodiment, a jacket 115 forms the cable's exterior surface. The jacket 115 can comprise a medium density polyethylene, for example. An armor 175 is located under the jacket 115 and provides crush resistance. The armor 175 can comprise a corrugated metal, flexible interlocking structure or other appropriate system for providing mechanical protection. The net 145 incorporates openings 155 to achieve controlled jacket-to-armor coupling as discussed above.

Two ripcords 720 are disposed between the armor 175 and the jacket 115 to facilitate jacket removal. Two high-strength ripcords 730 are disposed under the armor 175 to facilitate armor removal 175 during field service or cable installation.

A longitudinally wrapped water-swellable tape 725 is disposed under the armor 175, facing the buffer tubes 150, 150C. Water-swellable glass strength yarns 710 provide additional support and longitudinal strength. As illustrated, the fiber optic cable 700 comprises 24 of the water-swellable glass strength yarns 710 located between the water-swellable tape 725 and the armor 175. Alternatively, the water-swellable glass strength yarns 710 can be disposed under the water-swellable tape 725, for example adjoining the ring of buffer tubes 150.

As illustrated, two rigid strength members 715 are located between the jacket 115 and the armor 175. The rigid strength members 715 can be formed of carbon steel and can be placed at 3 and 9 o'clock positions or at 6 and 12 o'clock positions, for example. As illustrated, the net 145 is positioned between the rigid strength members 715 and the jacket 115. Alternatively, the net 145 can be positioned between the rigid strength members 715 and the armor 175.

Technology for protecting signal conductors, including controlling coupling between a cable armor and a cable jacket, has been described. The technology can be applied to other adjacent cable elements, as well. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A fiber optic cable comprising:
    an armor, comprising metal, extending lengthwise;
    an optical fiber disposed in a tubular volume defined by the armor;
    a jacket, comprising a polymeric material, circumferentially covering the armor; and
    a net extending lengthwise between the armor and the jacket, the net comprising water-swellable material and a plurality of openings, wherein the jacket adheres to the armor through the openings.

2. The fiber optic cable of claim 1, wherein the net adjoins the armor and the jacket.

3. The fiber optic cable of claim 1,
    wherein a buffer tube is disposed in the tubular volume, and
    wherein the buffer tube houses a ribbon of optical fibers that comprises said optical fiber.

4. The fiber optic cable of claim 1, wherein the net comprises:
    super absorbent material; and
    a woven mesh fabric.

5. The fiber optic cable of claim 1, wherein the net is operable to block water from flowing along the cable between the armor and the jacket and to provide a predetermined level of coupling between the armor and the jacket, and
    wherein the net comprises strands of diameter between about 250 microns and about 600 microns.

6. The fiber optic cable of claim 1, wherein the armor further comprises a polymer, and
    wherein the jacket adheres to the armor through the net.

7. The fiber optic cable of claim 1, wherein the net comprises:
    a width extending circumferentially around the armor; and
    openings each having a dimension that is in the range of ten to fifty percent of the width.

8. A fiber optic cable comprising:
    a buffer tube circumscribing a plurality of optical fibers;
    a metallic armor circumscribing the buffer tube;
    a net comprising water-swellable material and circumscribing the metallic armor; and
    an outer jacket circumscribing the metallic armor,
    wherein the outer jacket adheres to the metallic armor through openings in the net.

9. The fiber optic cable of claim 8, wherein water-swellable powder is disposed between the metallic armor and the outer jacket, and
    wherein the net comprises a woven fabric.

10. The fiber optic cable of claim 8, wherein the net comprises a network of monofilament strands.

11. The fiber optic cable of claim 8, wherein between approximately 10 and approximately 99 percent of the net is open area.

12. The fiber optic cable of claim 8, wherein the net is operable to provide a predetermined amount of coupling between the metallic armor and the outer jacket.

13. The fiber optic cable of claim 8, wherein the outer jacket comprises a thermoplastic material,
    wherein the metallic armor comprises a polymeric coating,
    wherein the thermoplastic material adheres to the polymeric coating through the net, and
    wherein the net comprises:
        a woven mesh comprising filaments; and
        water-swellable particles adhering to the filaments.

14. A fiber optic cable comprising:
    at least one buffer tube extending along the fiber optic cable;
    a plurality of optical fibers disposed in the at least one buffer tube;

an armor, comprising metal, covering the at least one buffer tube and extending lengthwise;

a net formed around the armor and extending lengthwise, the net comprising water-swellable material and openings;

super absorbent material positioned within one or more of the openings; and a jacket disposed over the net and adhering to the armor through the openings.

15. The fiber optic cable of claim 14, wherein between approximately ten and approximately ninety-nine percent of the net is open on an area basis.

16. The fiber optic cable of claim 14, wherein the at least one buffer tube comprises a dry buffer tube, wherein the plurality of optical fibers comprises at least one ribbon of optical fibers, wherein the size of the openings provides a level of coupling between the armor and the jacket, and wherein the net comprises yarn.

17. The fiber optic cable of claim 14, wherein the jacket comprises a first thermoplastic material having a first melting temperature, wherein the net comprises a second thermoplastic material having a second melting temperature, and wherein the second melting temperature is substantially higher than the first melting temperature.

18. The fiber optic cable of claim 14, wherein the armor has an outwardly facing surface defining a circumference dimension, and wherein the openings have at least one respective dimension that is at least approximately one-eighth of the circumference dimension and is no more than approximately one-half of the circumference dimension.

19. The fiber optic cable of claim 1, further comprising:

super absorbent material positioned between the armor and the jacket within one or more of the plurality of openings in the net.

20. The fiber optic cable of claim 8, further comprising:

super absorbent material positioned within one or more of the openings in the net.

* * * * *